US012712783B2

(12) United States Patent
Patrich et al.

(10) Patent No.: US 12,712,783 B2
(45) Date of Patent: Aug. 18, 2026

(54) DETERMINING NETWORK TOPOLOGY INFORMATION FROM DOMAIN NAME SYSTEM (DNS) QUERIES

(71) Applicant: Microsoft Technology Licensing, LLC, Redmond, WA (US)

(72) Inventors: Dotan Patrich, Kfar Saba (IL); Sofia Belikovetsky, Ra'anana (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 28 days.

(21) Appl. No.: 18/813,880

(22) Filed: Aug. 23, 2024

(65) Prior Publication Data

US 2026/0058877 A1 Feb. 26, 2026

(51) Int. Cl.

*H04L 12/46* (2006.01)
*H04L 41/12* (2022.01)
*H04L 41/22* (2022.01)
*H04L 61/4511* (2022.01)

(52) U.S. Cl.

CPC .............. *H04L 41/12* (2013.01); *H04L 41/22* (2013.01); *H04L 61/4511* (2022.05)

(58) Field of Classification Search

CPC ..... H04L 41/12; H04L 61/4511; H04L 41/22; H04L 63/1425; H04L 63/145; H04L 12/46; H04L 61/3015

USPC .......................................................... 709/223

See application file for complete search history.

(56) References Cited

U.S. PATENT DOCUMENTS

| | | | | |
|---|---|---|---|---|
| 7,075,536 | B1 * | 7/2006 | Goldschmidt | H04L 41/0253 715/234 |
| 2001/0039585 | A1 * | 11/2001 | Primak | H04L 67/1001 709/224 |
| 2002/0039585 | A1 * | 4/2002 | Schlievert | A61P 37/04 424/190.1 |
| 2023/0108321 | A1 * | 4/2023 | Chopra | G06F 3/0637 711/163 |
| 2024/0291718 | A1 * | 8/2024 | Vuda | H04L 41/122 |

OTHER PUBLICATIONS

"Are DNS endpoints exposed?", accessed on link https://kubernetes.io/docs/tasks/administer-cluster/dns-debugging-resolution/#are-dns-endpoints-exposed, 2024, 3 pages.

"Are DNS queries being received/processed?", accessed on link https://kubernetes.io/docs/tasks/administer-cluster/dns-debugging-resolution/#are-dns-queries-being-received-processed, 2024, 3 pages.

"Create Kubernetes Pod Network Map", accessed on link https://stackoverflow.com/questions/59474694/create-kubernetes-pod-network-map, Dec. 25, 2019, 5 pages.

(Continued)

*Primary Examiner* — Jude Jean Gilles

(74) *Attorney, Agent, or Firm* — Weaver IP L.L.C.

(57) ABSTRACT

Systems, methods, apparatuses, and computer program products are disclosed for determining network topology information using domain name system (DNS) queries. Network connection and dependency information of elements in a compute cluster are determined from DNS requests. A network topology is generated based on the determined network connection and dependency information. A network policy is generated for the computing cluster based on the network topology.

20 Claims, 5 Drawing Sheets

(56) References Cited

OTHER PUBLICATIONS

"Customizing DNS Service", accessed on link https://kubernetes.io/docs/tasks/administer-cluster/dns-custom-nameservers/, retrieved on Jun. 26, 2024, 4 pages.
"DNS for Services and Pods", accessed on link https://kubernetes.io/docs/concepts/services-networking/dns-pod-service/, retrieved on Jun. 26, 2024, 7 pages.
"How to Configure DNS for Services and Pods in Kubernetes", accessed on link https://marketsplash.com/how-to-configure-dns-for-services-and-pods-in-kubernetes/#link52-, 2024, 17 pages.
"Ingress & Egress", accessed on link https://www.tkng.io/ingress/, retrieved on Jun. 26, 2024, 2 pages.
"Ingress", accessed on link https://kubernetes.io/docs/concepts/services-networking/ingress/, retrieved on Jun. 26, 2024, 15 pages.
"Kubernetes Egress", accessed on link https://www.solo.io/topics/service-mesh/kubernetes-egress/, retrieved on Jun. 26, 2024, 7 pages.
"Kubernetes Hardening Guide", accessed on link Cybersecurity Technical Report, Aug. 2022, 66 pages.
"Kubernetes", accessed on link https://coredns.io/plugins/kubernetes/, retrieved on Jun. 26, 2024, 7 pages.
"Mapping a Kubernetes network", accessed on link https://docs.otterize.com/features/network-mapping-network-policies/tutorials/k8s-network-mapper, retrieved on Jun. 26, 2024, 5 pages.
"Network Policies", accessed on link https://kubernetes.io/docs/concepts/services-networking/network-policies/, retrieved on Jun. 26, 2024, 10 pages.
"Network topology and connectivity considerations for AKS", accessed on link https://learn.microsoft.com/en-us/azure/cloud-adoption-framework/scenarios/app-platform/aks/network-topology-and-connectivity, Apr. 8, 2024, 9 pages.
"resolv.conf(5)—Linux manual page", accessed on link https://www.man7.org/linux/man-pages/man5/resolv.conf.5.html, retrieved on Jun. 26, 2024, 6 pages.
"Service discovery and DNS", accessed on link https://cloud.google.com/kubernetes-engine/docs/concepts/service-discovery, retrieved on Jun. 26, 2024, 5 pages.
"Spekt", accessed on link https://github.com/spekt8/spekt8, retrieved on Jun. 26, 2024, 5 pages.
"Topology Aware Routing", accessed on link https://kubernetes.io/docs/concepts/services-networking/topology-aware-routing/, retrieved on Jun. 26, 2024, 4 pages.
Kubernetes DNS-Based Service Discovery, accessed on link https://github.com/kubernetes/dns/blob/master/docs/specification.md, retrieved on Jun. 26, 2024, 7 pages,.
Onukwube, Eze., "Guide to Kubernetes Networking", accessed on link https://earthly.dev/blog/k8s-networking/, Jul. 14, 2023, 13 pages.
Onukwube, Eze., "The Role of DNS in Kubernetes", accessed on link https://earthly.dev/blog/k8s-networking/#the-role-of-dns-in-kubernetes, Jul. 14, 2023, 4 pages.
Reitsma, Steven., "The life of a DNS query in Kubernetes", accessed on link https://www.nslookup.io/learning/the-life-of-a-dns-query-in-kubernetes/, Dec. 29, 2023, 11 pages.
Rot, Udi., "Kube-DNS: How to Implement and Best Practices", accessed on link https://www.groundcover.com/blog/kube-dns, Dec. 28, 2023, 10 pages.
Venugopal, Viswajith., "Guide to Kubernetes egress network policies", accessed on link https://www.cncf.io/blog/2020/02/10/guide-to-kubernetes-egress-network-policies/, Feb. 10, 2020, 10 pages.
Venugopal, Viswajith., "Guide to Kubernetes Egress Network Policies", accessed on link https://www.redhat.com/en/blog/guide-to-kubernetes-egress-network-policies, Apr. 5, 2019,11 pages.

* cited by examiner

DETERMINING NETWORK TOPOLOGY INFORMATION FROM DOMAIN NAME SYSTEM (DNS) QUERIES

BACKGROUND

Network topology information aid systems (e.g., network management systems, etc.) and users (e.g., network administrators, IT (information technology) professionals, etc.) in the management of networks. Network topology information can include information on the relationships and/or dependencies between various components within the network, including, but not limited to, applications, services, servers, switches, routers, and/or other infrastructure elements. Based on these relationships and/or dependencies, network policies can be generated and deployed to improve the performance and/or security of the network.

The Domain Name System (DNS) is a hierarchical and distributed name service that provides a naming system for entities such as computers, services, and other resources on the Internet or other Internet Protocol (IP) networks. DNS associates various information with domain names (identification strings) assigned to each of the associated entities. DNS translates readily memorized domain names to the numerical IP addresses used for locating and identifying computer services and devices with the underlying network protocols. DNS has been a component of the functionality of the Internet since 1985.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, methods, apparatuses, and computer program products are disclosed for determining network topology information using domain name system (DNS) queries. Network connection and dependency information of elements in a compute cluster are determined from DNS requests. A network topology is generated based on the determined network connection and dependency information. A network policy is generated for the computing cluster based on the network topology.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
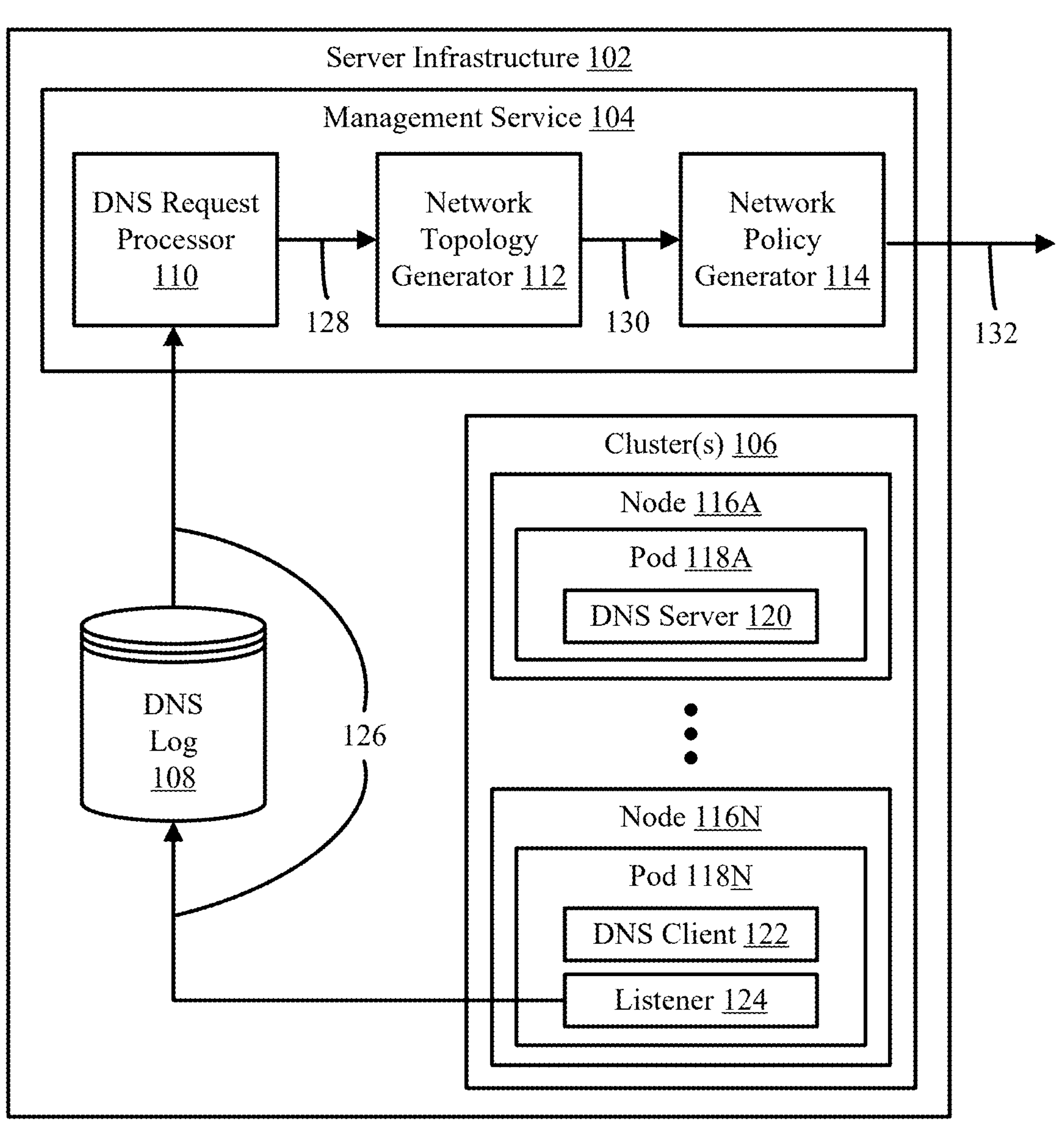
FIG. 1 shows a block diagram of an example system for generating a network policy using network topology information determined from DNS queries, in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

As used herein, the term "computing cluster" refers to a group of interconnected computers (nodes) that work together to perform computing tasks. In embodiments, a computing cluster distributes workloads among nodes to improve computational speed, reliability, and/or scalability for tasks that require significant computing power and/or parallel processing capabilities. In embodiments, a computing cluster includes, but is not limited to, a container cluster.

As used herein, the term "container cluster" refers to a group of interconnected servers (nodes) that collaborate to manage and deploy containerized applications. In embodiments, a container cluster employs an orchestration platform, such as, but not limited to, Kubernetes and/or Docker Swarm, to automate the deployment, scaling, and/or orchestration of containers across the nodes.

As used herein, the term "containerized application" refers to an application that has been packaged into a container along with its dependencies, configurations, libraries, and/or other binaries. In embodiments, a containerized application is deployable on a computing or container cluster, and provides a consistent and isolated environment for running applications to ensure they run the same way regardless of where they are deployed.

II. Example Embodiments

Network topology information aid systems (e.g., network management systems, etc.) and users (e.g., network administrators, IT (information technology) professionals, etc.) in the management of computing clusters. For instance, network topology information, including, but not limited to, the relationships and/or dependencies between various components within the network enable systems to automatically and/or semi-automatically generate and/or deploy network policies to improve the performance and/or security of the computing cluster. Network topology information also user administration of the computing clusters in various tasks, such as, but not limited to, improving visibility, understanding application dependencies, and/or applying network policies to achieve environment hardening. In container cluster environments, such as, but not limited to, Kubernetes or K8s, security products collect network flow logs from the cluster environment to build network topologies that convey dependencies between pods and services in the container cluster. However, such an approach is very compute intensive and specific to the version of the Kubernetes cluster network interface (CNI) implementation employed by the container cluster.

In Kubernetes, hostnames enable services and/or pods to communicate with each other within the cluster. For instance, pods are assigned a customizable hostname (e.g., 'foo') and/or a subdomain (e.g., 'bar') that may be combined with a namespace (e.g., 'my-namespace') and the cluster domain (e.g., 'cluster.local') to form a fully qualified domain name (FQDN) for the pod (e.g., 'foo.bar.my-namespace.svc.cluster.local'), and services are assigned a service name (e.g., 'my-service') that may be combined with a namespace (e.g., 'my-namespace') and the cluster domain (e.g., 'cluster.local') to form an FQDN for the service (e.g., 'my-service.my-namespace.svc.cluster.local'). In embodiments, a DNS server (e.g., CoreDNS) automatically creates DNS records for pods and services to enable dynamic service discover based on their FQDN. In embodiments, Kubernetes provides a DNS server to facilitate service discovery and hostname resolution within the cluster, and to serve as a recursive DNS server for external domain names and/or hostnames associated with external resources.

Embodiments disclosed herein are directed to the use of domain name system (DNS) requests to determine network topology information for a computing cluster. For instance, Kubernetes's use of DNS to facilitate communications between pods and/or services results in DNS requests and/or replies that may be used to infer connection and/or dependency relationships between pods and/or services within a Kubernetes cluster. In embodiments, network topology and/or dependency information based on information from collected DNS requests that are generated and/or transmitted by elements of the computing cluster. For instance, a connection between two pods in a computing cluster can be inferred from a DNS request originating from a first pod that includes a hostname associated with a second pod. In further embodiments, dependency relationships are inferred from information in the DNS requests. For instance, a DNS request originating from a first pod that includes a hostname associated with a service of a second pod indicates the existence of a dependency between the first pod, the second pod, and/or services executing thereon. Additionally, a DNS request for an external domain indicates, in embodiments, a dependency relationship between an element of the computing cluster and an external resource. Determining network topology information using DNS requests is more efficient than approaches that rely on network flow logs, and is also agnostic to the CNI implemented employed by the computing cluster.

In embodiments, network policies are generated based on network topology information. For instance, existing dependency relationships between elements within the computing cluster and/or between an element of the computing cluster and an external resource are determined based on network connection and dependency information of a computing cluster, and a network policy is generated to harden the computing cluster environment consistent with these existing dependency relationships. In embodiments, the generated network policy is automatically and/or semi-automatically implemented in the computing cluster environment. For instance, a generated network policy is automatically deployed to the computing cluster environment by, for example, but not limited to, deploying the network policy as a firewall policy to permit and/or restrict network connectivity, and/or the like. In instances, the generated network policy can be semi-automatically implemented by presenting the network policy to a user (e.g., administrator, IT professional, etc.) for approval and deployment.

These and further embodiments enable the functionality described above and additional functionality. Such embodiments are described in further detail as follows.

For example, FIG. 1 shows a block diagram of an example system 100 for generating a network policy using network topology information determined from DNS queries, in accordance with an embodiment. As shown in FIG. 1, system 100 includes a server infrastructure 102 that comprises a network management service 104, one or more clusters 106, and a DNS log 108. Management service 104 further includes a DNS request processor 110, a network topology generator 112, and a network policy generator 114. Cluster(s) 106 further include one or more nodes 116A-116N that include one or more pods 118A-118N. In embodiments, node(s) 116A-116N include the same or a different number of pod(s) 118 than is depicted in FIG. 1. Pod 118A includes a DNS server 120 and pod 118N includes a DNS client 122 and a listener 124. In embodiments, pod(s) 118A-118N are located on the same and/or different node(s) 116A-116N than is depicted in FIG. 1. System 100 is described in further detail as follows.

Server infrastructure 102 comprises a network-accessible server set (e.g., cloud-based environment or platform). In an embodiment, the underlying resources of server infrastructure 102 are co-located (e.g., housed in one or more nearby buildings with associated components such as backup power supplies, redundant data communications, environmental controls, etc.) to form a datacenter, are distributed across different regions, and/or are arranged in other manners. As shown in FIG. 1, server infrastructure 102 comprises management service 104, cluster(s) 106 and DNS log 108, each of which will be described in greater detail below. Various example implementations of server infrastructure 102 are described below in reference to FIG. 7 (e.g., network-based server infrastructure 770, and/or components thereof).

Management service 104 comprises services suitable for performing functions that are ascribed thereto in the following description, as will be appreciated by persons skilled in the relevant art(s), including those mentioned elsewhere herein or otherwise known. In embodiments, management service 104 includes services for managing cluster(s) 106 and/or components thereof. As shown in FIG. 1, management service 104 includes DNS request processor 110, network topology generator 112, and network policy generator 114, each of which will be described in greater detail below.

Cluster(s) 106 comprise a group of interconnected computers (nodes) that work together to perform computing tasks. In embodiments, cluster(s) 106 include, but are not limited to, computing clusters, container clusters, Kubernetes clusters, and/or the like. In embodiments, an orchestration platform (not shown), such as, but not limited to, Kubernetes, Docker Swarm, Apache Mesos, and/or the like, manages deployment, scaling, and/or operation of containerized applications on node(s) 116A-116N and/or pod(s) 118A-118N of cluster(s) 106.

DNS log 108 comprises a record of DNS queries and/or responses that occur within cluster(s) 106. In embodiments, entries of DNS log 108 include details such as, but not limited to, a timestamp of a DNS query and/or response, an IP address of the source of the DNS request, the queried hostname and/or domain name, the type of DNS query (e.g., A, AAAA, MX, etc.), and/or the response provided by DNS server 120, including any resolved IP addresses. In embodiments, listener 124 populates DNS log 108 by providing one or more detected DNS requests 126 to DNS log 108. In embodiments, listener 124 is implemented using an extended Berkeley Packet filter (eBPF) that exposes programmable hooks to the network stack to enable network monitoring and/or auditing. In embodiments, DNS log 108 is populated with DNS requests and/or response originating from other sources, such as, but not limited to, DNS server 120, DNS client 122, and/or components thereof. In embodiments, DNS log 108 includes DNS queries and/or responses associated with an audit log (e.g., Kubernetes audit log, etc.) associated with cluster(s) 106.

DNS request processor 110 is configured to access DNS request(s) 126 in DNS log 108, and process DNS request(s) 126 to determine connection and/or dependency relationships between source pod(s) 118A-118N and target pod(s) 118A-118N, or between source pod(s) 118A-118N and an external resource. In embodiments, DNS request processor 110 identifies source pod(s) 118A-118N by determining the IP addresses of the sources of DNS request(s) 126, and/or performing a reverse DNS lookup to determine hostnames of source pod(s) 118A-118N associated with the IP addresses. In embodiments, DNS request processor 110 identifies target pod(s) 118A-118N by determining the hostnames queried by DNS request(s) 126. In embodiments, DNS request processor 110 identifies external resources by determining external hostnames queried by DNS request(s) 126 that are associated with an external domain outside of a domain namespace associated with cluster(s) 106. In embodiments, DNS request processor 110 provides, as relationships 128, the determined connection and/or dependency relationships to network topology generator 112.

Network topology generator 112 is configured to generate a network topology data structure 130 for cluster(s) 106 based on relationships 128 determined from DNS request(s) 126. In embodiments, network topology generator 112 generates a data structure (e.g., graph, directed graph, dependency graph, etc.) that include nodes for pod(s) 118A-118N, cluster services, and/or external resources, and edges connecting nodes having connection and/or dependency relationships. For instance, network topology generator 112 determines connection and/or dependency relations based on relationships 128 received from DNS request processor 110, and/or other detected communications received from listener 124. In embodiments, a directed edge connects a first node and a second node of the graph to indicate a dependency relationship between the first node and the second node. For instance, an arrow from a first node to a second node may indicate that the first node is dependent on the second node, or vice versa. In embodiments, a dual dependency between a first node and a second node is indicated through two directed edges or arrows in opposite directions connecting the first node and the second node. In embodiments, network topology data structure 130 includes additional information, such as, but not limited to, hostnames associated with the nodes, type of dependency relationship associated with the edges, type of services associated with the nodes, and/or the like. In embodiments, network topology generator 112 gleans such additional information from hostnames associated with the nodes. For instance, a hostname or domain name that includes "kubernetes.default" indicates that the associated pod(s) 118A-118N is a cluster service. In embodiments, network topology generator 112 provides network topology data structure 130 as a graph, directed graph, and/or dependency graph to network policy generator 114.

Network policy generator 114 is configured determine existing connection and/or dependency relationships between pod(s) 118A-118N, cluster services, and/or external resources based on network topology data structure 130, and generate network policy 132 that hardens the cluster environment consistent with the existing connection and/or dependency relationships. For instance, network policy generator 114 can generate a network policy 132 that permits network connectivity and/or communications consistent with the existing connection and/or dependency relationships, and/or denies network connectivity and/or communications that are inconsistent with the existing connection and/or dependency relationships. In embodiments, network policy generator 114 can generate a network policy 132 that alerts an entity (e.g., owner, customer, tenant, administrator, etc.) associated with cluster(s) 106 when communications inconsistent with existing connection and/or dependency relationships are detected. In embodiments, network policy generator 114 automatically implements network policy 132 by deploying network policy 132, for example, but not limited to, as a firewall policy, as a routing policy, and/or the like. In embodiments, network policy generator 114 semi-automatically implements network policy 132 by providing network policy 132 to an entity (e.g., owner, customer, tenant, administrator, etc.) associated with cluster(s) 106 for approval, and deploys network policy 132 upon approval by the entity.

Node(s) 116A-116N comprise any computing device and/or a plurality of computing devices suitable for performing functions that are ascribed thereto in the following description, as will be appreciated by persons skilled in the relevant art(s), including those mentioned elsewhere herein or otherwise known. In embodiments, node(s) 116A-116N include, but are not limited to, a physical machine (e.g., server, computer, etc.), a virtual machine (e.g., virtual server, emulated server, etc.), a cluster node, a Kubernetes node, a Docker node, a Mesos node, and/or the like. In embodiments, node(s) 116A-116N includes any number of pod(s) 118A-118N running thereon.

Pod(s) 118A-118N comprise deployable units that include one or more containerized applications. In embodiments, containerized applications in a same pod share a single IP address and/or a network namespace, and share the resources (e.g., CPU, memory, storage, etc.) of node(s) 116A-116N on which the pod is deployed. In embodiments, containerized applications in a same pod are closely related applications that communicate with one another to process related tasks.

DNS server 120 comprises one or more DNS server instances that are configured to handle and/or respond to queries originating from cluster(s) 106 by either providing the requested IP address from its own records and/or forwarding the query to other DNS servers. In embodiments, DNS server 120 is an authoritative DNS server for cluster(s) 106 and a recursive DNS server for external domain names and/or hostnames associated with external resources. For instance, DNS server 120 may either respond to DNS request(s) to resolve external domain names and/or hostnames with cached data, or by sending one or more DNS requests to a root nameserver, a TLD nameserver, and/or an authoritative nameserver associated with the external domain names and/or hostnames. In embodiments DNS server 120 is implemented as a CoreDNS service that runs as a Kubernetes service.

DNS client 122 comprises one or more DNS client instances that are configured to resolve DNS queries on behalf of pod(s) 118A-118N and/or components thereof. In embodiments, when pod(s) 118A-118N need to communicate with other pod(s) 118A-118N, and/or an external resource, DNS client 122 sends a DNS query (not shown) to DNS server 120 that requests the IP address associated with the hostname and/or domain name of the other pod(s) 118A-118N, and/or an external resource.

Listener 124 is configured to monitor outgoing communications originating from pod(s) 118A-118N. In embodiments, listener 124 is implemented using an eBPF that exposes programmable hooks to the network stack to enable monitoring and/or auditing of cluster traffic. In embodiments, listener 124 monitors outgoing communications associated with pod(s) 118A-118N to detect DNS request(s) 126, and provides DNS request(s) 126 to DNS log 108 for storage thereon. In embodiments, listener 124 monitors outgoing communications associated with pod(s) 118A-118N to detect communications directed to an IP address associated with a cluster service (e.g., Kubernetes service, etc.) associated with cluster(s) 106 and/or an external resource. For instance, pod(s) 118A-118N may, in embodiments, already know the IP address of a cluster service and/or external resource, and may communicate directly with the cluster service and/or external resource without resolving a hostname and/or domain name using a DNS request. In such instances, listener 124 is configured to detect such outgoing communications, and determine that the IP address is associated with a cluster service and/or an external resource based on, for example, but not limited to, environmental variables, reverse DNS lookups, and/or the like. In embodiments, listener 124 provides relevant outgoing communications, and/or relationships inferred therefrom, to network topology generator 112 inclusion in network topology data structure 130.

Figure 2:
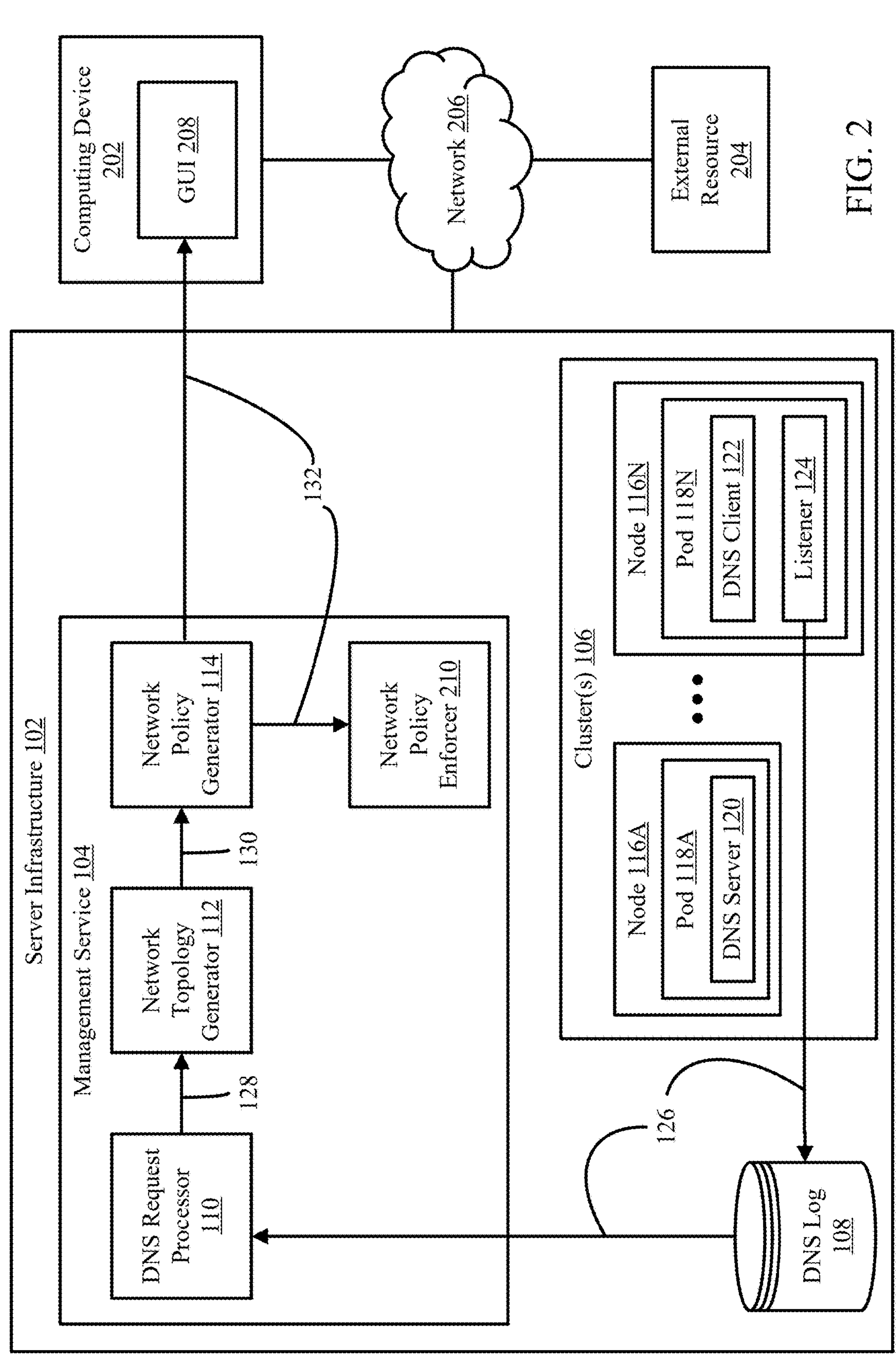
FIG. 2 shows a block diagram of an example system for implementing a network policy generated from network topology information determined from DNS queries, in accordance with an embodiment.

Embodiments described herein may operate in various ways to implement a network policy generated based on a network topology determined from DNS queries. For instance, FIG. 2 depicts a block diagram of a system 200 for generating a periodic proof to a network policy generated based on a network topology determined from DNS queries, in accordance with an embodiment. As shown in FIG. 2, system 200 includes network infrastructure 102, management service 104, cluster(s) 106, DNS log 108, DNS request processor 110, network topology generator 112, network policy generator 114, node(s) 116A-116N, pod(s) 118A-118N, DNS server 120, DNS client 122, and listener 124. System 200 further includes a computing device 202 and an external resource 204 communicatively coupled to network infrastructure 102 via a network 206. Management service 104 further includes a network policy enforcer 210, and computing device 202 further includes a graphical user interface (GUI) 208. System 200 is described in further detail as follows.

Computing device 202 comprises any computing device suitable for performing functions that are ascribed thereto in the following description, as will be appreciated by persons skilled in the relevant art(s), including those mentioned elsewhere herein or otherwise known. In embodiments, computing device 202 includes a device controlled by an entity (e.g., owner, customer, tenant, administrator, etc.) associated with cluster(s) 106, and is configured to enable the entity to manage cluster(s) 106 via GUI 208. Various example implementations of computing device 202 are described below in reference to FIG. 7 (e.g., computing device 702, network-based server infrastructure 770, and/or on-premises servers 792).

External resource 204 comprises any resource accessed by cluster(s) 106, and/or components thereof, and is external to cluster(s) 106. In embodiments, external resource 204 belongs to, or is associated with, a domain name and/or hostname outside of a namespace associated with cluster(s) 106.

Network 206 comprises any computing device or plurality of computing devices suitable for performing functions that are ascribed thereto in the following description, as will be appreciated by persons skilled in the relevant art(s), including those mentioned elsewhere herein or otherwise known. In embodiments, network 206 is configured to enable communications between devices communicatively coupled thereto. Various example implementations of network 206 are described below in reference to FIG. 7 (e.g., network 704, and/or components thereof).

GUI 208 comprises any user interface suitable for performing functions that are ascribed thereto in the following description, as will be appreciated by persons skilled in the relevant art(s), including those mentioned elsewhere herein or otherwise known. In embodiments, GUI 208 enables a user of computing device 202 to manage cluster(s) 106 by interacting with GUI 208. For instance, GUI 208 is configured to, in embodiments, display network topology data structure 130 and/or network policy 132 to enable a user of computing device 202 to view network topology data structure 130 and/or network policy 132, and/or to approve or deny the deployment of network policy 132.

Network policy enforcer 210 is configured to receive network policy 132 from network policy generator 114, and to apply network policy 132 to cluster(s) 106. In embodiments, network policy enforcer 210 automatically and/or semi-automatically implements network policy 132 by automatically and/or semi-automatically (e.g., after approval, etc.) deploying network policy 132 to the computing cluster environment by, for example, but not limited to, deploying the network policy as a firewall policy to permit and/or restrict network connectivity to and/or from components of cluster(s) 106, modifying settings of cluster(s) 106, and/or the like.

Figure 3:
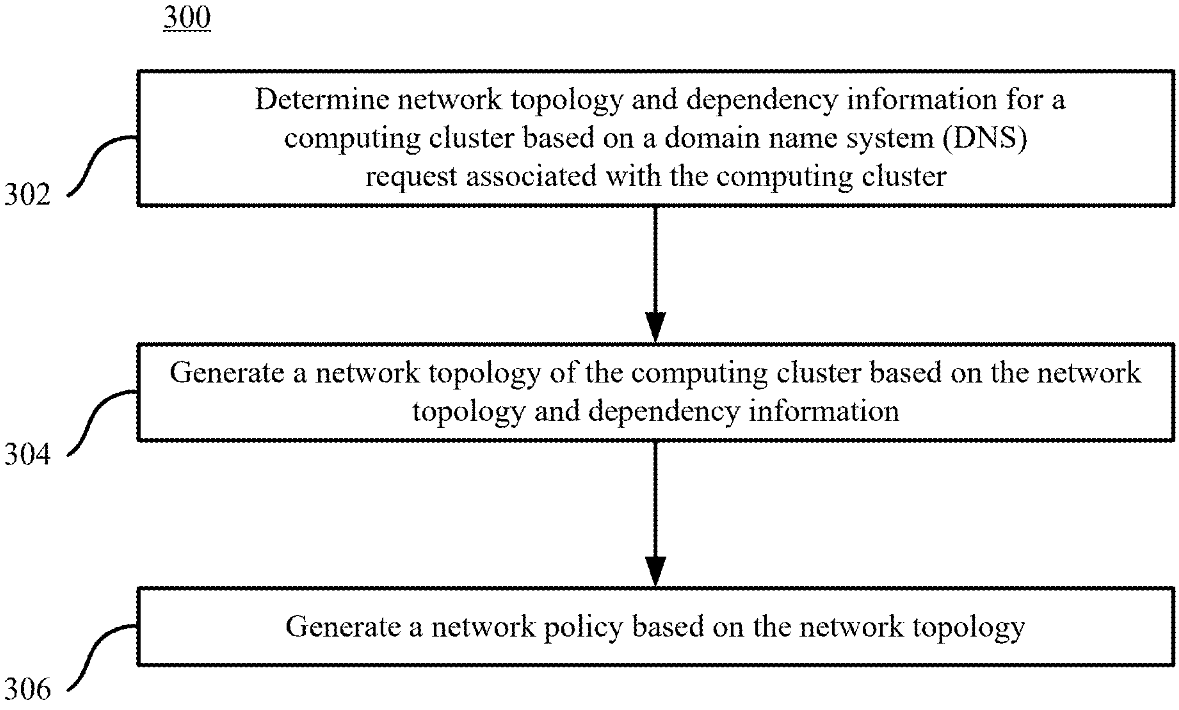
FIG. 3 depicts a flowchart of a process for generating a network policy using network topology information determined from DNS queries, in accordance with an embodiment.

Embodiments described herein may operate in various ways to generate a network policy based on a network topology determined from DNS queries. For instance, FIG. 3 depicts a flowchart 300 of a process for generating a network policy based on a network topology determined from DNS queries, in accordance with an embodiment. Server infrastructure 102, management service 104, DNS request processor 110, network topology generator 112, and/or network policy generator 114 may, for example, operate according to flowchart 300. Note that not all steps of flowchart 300 may need to be performed in all embodiments, and in some embodiments, the steps of flowchart 300 may be performed in different orders than shown. Flowchart 300 is described as follows with respect to FIGS. 1-2 for illustrative purposes.

Flowchart 300 starts at step 302. In step 302, network connection and dependency information are determined for a computing cluster based on a DNS request associated with the computing cluster. For instance, DNS request processor 110 determines connection and/or dependency relationships between source pod(s) 118A-118N and target pod(s) 118A-118N, or between source pod(s) 118A-118N and an external resource from information in DNS request(s) 126. In embodiments, DNS request processor 110 provides, as relationships 128, the determined connection and/or dependency relationships to network topology generator 112.

In step 304, a network topology of the computing cluster is generated based on the network connection and dependency information. For instance, network topology generator 112 generates a network topology data structure 130 for cluster(s) 106 based on relationships 128 determined from DNS request(s) 126. In embodiments, network topology generator 112 generates a data structure (e.g., graph, directed graph, dependency graph, etc.) that include nodes for pod(s) 118A-118N, cluster services, and/or external resources, and edges connecting nodes having connection and/or dependency relationships.

In step 306, a network policy is generated based on the network topology. For instance, network policy generator 114 determines existing connection and/or dependency relationships between pod(s) 118A-118N, cluster services, and/or external resources, and generates network policy 132 based on the existing connection and/or dependency relationships in network topology data structure 130. For instance, network policy generator 114 can generate a network policy 132 that permits network connectivity and/or communications consistent with the existing connection and/or dependency relationships, and/or denies network connectivity and/or communications that are inconsistent with the existing connection and/or dependency relationships. In embodiments, network policy generator 114 can generate a network policy 132 that alerts an entity (e.g., owner, customer, tenant, administrator, etc.) associated with cluster(s) 106 when communications inconsistent with existing connection and/or dependency relationships are detected. In embodiments, network policy generator 114 provides network policy 132 to computing device 202 for display via GUI 208 to prompt a user of computing device 202 to approve and/or deny deployment of network policy 132. In embodiments, network policy generator 114 provides network policy 132 to network policy enforcer 210 to enable network policy enforcer 210 to automatically and/or semi-automatically enforce network policy 132 on cluster(s) 106.

Figure 4:
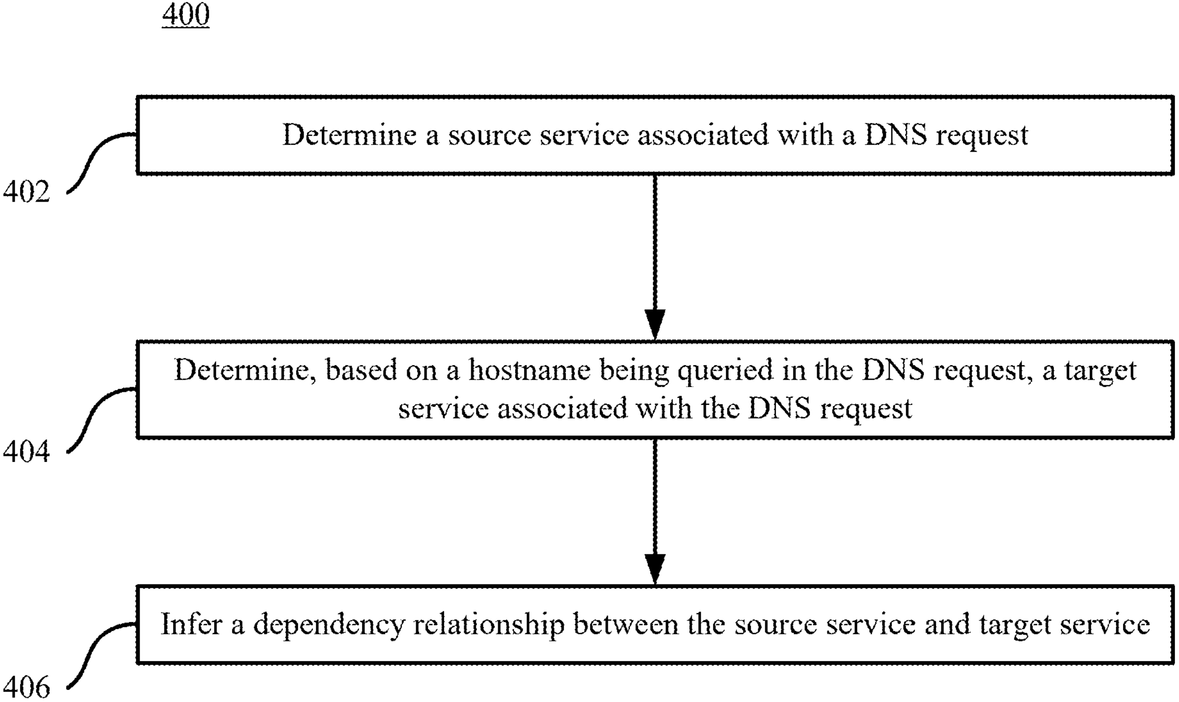
FIG. 4 depicts a flowchart of a process for determining network topology information using DNS queries, in accordance with an embodiment.

Embodiments described herein may operate in various ways to determine network topology information using DNS queries. For instance, FIG. 4 depicts a flowchart 400 of a process for determining network topology information using DNS queries, in accordance with an embodiment. Server infrastructure 102, management service 104, DNS request processor 110, and/or network topology generator 112 may, for example, operate according to flowchart 400. Note that not all steps of flowchart 400 may need to be performed in all embodiments, and in some embodiments, the steps of flowchart 400 may be performed in different orders than shown. Flowchart 400 is described as follows with respect to FIGS. 1-2 for illustrative purposes.

Flowchart 400 starts at step 402. In step 402, a source service associated with a DNS request is determined. For instance, DNS request processor 110 identifies source pod(s) 118A-118N by determining the IP addresses of the sources of DNS request(s) 126, and/or performing a reverse DNS lookup to determine hostnames of source pod(s) 118A-118N associated with the IP addresses. In embodiments, DNS request processor 110 identifies external resources by determining external hostnames queried by DNS request(s) 126 that are associated with an external domain outside of a domain namespace associated with cluster(s) 106.

In step 404, a target service associated with the DNS request is determined based on a hostname being queried by the DNS request. For instance, DNS request processor 110 identifies target pod(s) 118A-118N by determining the hostnames queried by DNS request(s) 126. In embodiments, DNS request processor 110 identifies external resources by determining external hostnames queried by DNS request(s) 126 that are associated with an external domain outside of a domain namespace associated with cluster(s) 106.

In step 406, a dependency relationship between the source service and the target service is inferred. For instance, DNS request processor 110 infers a dependency relationship between source pod(s) 118A-118N and target pod(s) 118A-118N based on DNS request(s) 126 originating from source pod(s) 118A-118N and requesting resolution of a hostname associated with target pod(s) 118A-118N and/or external resource 204.

Figure 5:
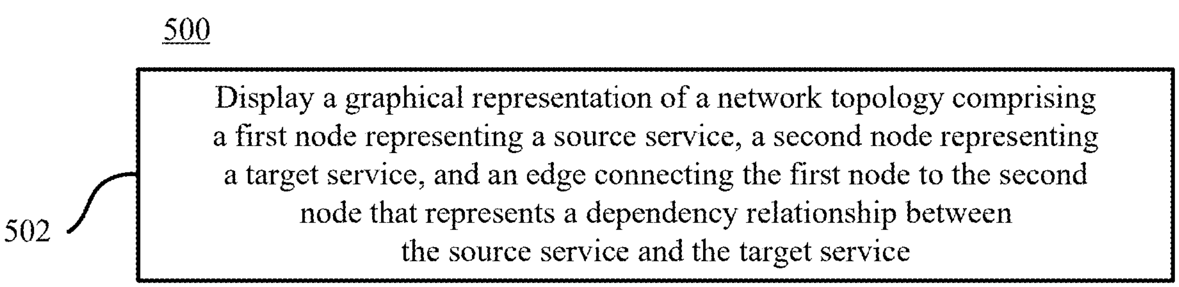
FIG. 5 depicts a flowchart of a process for displaying a network topology map determined from DNS queries, in accordance with an embodiment.

Embodiments described herein may operate in various ways to generate a network policy using a network topology determined from DNS queries. For instance, FIG. 5 depicts a flowchart 500 of a process for generating a network policy using a network topology determined from DNS queries, in accordance with an embodiment. Server infrastructure 102, management service 104, DNS request processor 110, network topology generator 112, network policy generator 114, computing device 202, and/or GUI 208 may, for example, operate according to flowchart 500. Flowchart 500 is described as follows with respect to FIGS. 1-2 for illustrative purposes.

Flowchart 500 starts at step 502. In step 502, a graphical representation of a network topology is displayed as a network topology map, the network topology map comprising a first node representing a source service, a second node representing a target service, and an edge connecting the first node to the second node that represents a dependency relationship between the source service and the target service. For instance, network topology generator 112 generates a network topology data structure 130 for cluster(s) 106 based on relationships 128 determined from DNS request(s) 126. In embodiments, network topology generator 112 generates a data structure (e.g., graph, directed graph, dependency graph, etc.) that include nodes for pod(s) 118A-118N, cluster services, and/or external resources, and edges connecting nodes having connection and/or dependency relationships. For instance, network topology generator 112 determines connection and/or dependency relations based on relationships 128 received from DNS request processor 110, and/or other detected communications received from listener 124. In embodiments, a directed edge connects a first node and a second node of the graph to indicate a dependency relationship between the first node and the second node. For instance, an arrow from a first node to a second node may indicate that the first node is dependent on the second node, or vice versa. In embodiments, a dual dependency between a first node and a second node is indicated through two directed edges or arrows in opposite directions connecting the first node and the second node. In embodiments, network topology data structure 130 includes additional information, such as, but not limited to, hostnames associated with the nodes, type of dependency relationship associated with the edges, type of services associated with the nodes, and/or the like. In embodiments, network topology generator 112 gleans such additional information from hostnames associated with the nodes. In embodiments, network topology generator 112 provides network topology data structure 130 as a graph, directed graph, and/or dependency graph to network policy generator 114.

Figure 6A:
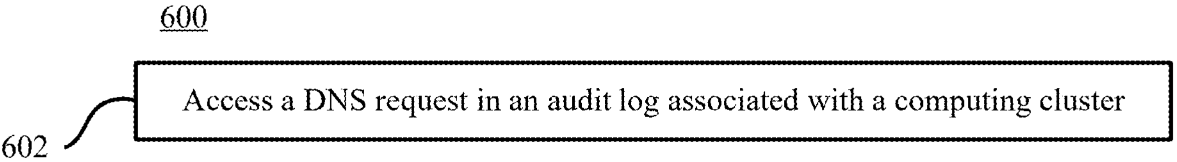
FIG. 6A depicts a flowchart of a process for accessing a DNS request in an audit log of a computing cluster, in accordance with an embodiment.

Embodiments described herein may operate in various ways to access a DNS request in an audit log of a computing cluster. For instance, FIG. 6A depicts a flowchart 600 of a process for accessing a DNS request in an audit log of a computing cluster, in accordance with an embodiment. Server infrastructure 102, management service 104, DNS request processor 110, network topology generator 112, and/or network policy generator 114 may, for example, operate according to flowchart 600. Flowchart 600 is described as follows with respect to FIGS. 1-2 for illustrative purposes.

Flowchart 600 starts at step 602. In step 602, a DNS request is accessed from an audit log associated with a computing cluster. For instance, DNS request processor 110 accesses DNS request(s) 126 from DNS log 108.

Figure 6B:
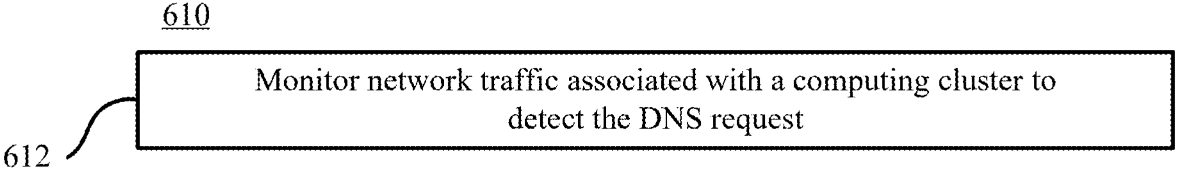
FIG. 6B depicts a flowchart of a process for monitoring network traffic to detect a DNS request, in accordance with an embodiment.

Embodiments described herein may operate in various ways to generate a network policy based on a network topology determined from DNS queries. For instance, FIG. 6B depicts a flowchart 610 of a process for generating a network policy based on a network topology determined from DNS queries, in accordance with an embodiment. Server infrastructure 102, management service 104, cluster(s) 106, DNS request processor 110, network topology generator 112, network policy generator 114, node(s) 116A-116N, pod(s) 118A-118N, and/or Listener 124, may, for example, operate according to flowchart 610. Flowchart 610 is described as follows with respect to FIGS. 1-2 for illustrative purposes.

Flowchart 610 starts at step 612. In step 612, a DNS request is detected by monitoring network traffic associated with a computing cluster. For instance, listener 124 monitors outgoing communications associated with pod(s) 118A-118N to detect DNS request(s) 126, and provides DNS request(s) 126 to DNS log 108 for storage thereon.

III. Example Mobile Device and Computer System Implementation

Server infrastructure 102, management service 104, cluster(s) 106, DNS log 108, DNS request processor 110, network topology generator 112, network policy generator 114, node(s) 116A-116N, pod(s) 118A-118N, DNS server 120, DNS client 122, listener 124, computing device 202, external resource 204, network 206, GUI 208, network policy enforcer 210, and/or the components described therein, and/or the steps of flowcharts 300, 400, 500, 600, and/or 610 are implemented in hardware, or hardware combined with one or both of software and/or firmware. For example, server infrastructure 102, management service 104, cluster(s) 106, DNS log 108, DNS request processor 110, network topology generator 112, network policy generator 114, node(s) 116A-116N, pod(s) 118A-118N, DNS server 120, DNS client 122, listener 124, computing device 202, external resource 204, network 206, GUI 208, network policy enforcer 210, and/or the components described therein, and/or the steps of flowcharts 300, 400, 500, 600, and/or 610 are each implemented as computer program code/instructions configured to be executed in one or more processors and stored in a computer readable storage medium. Alternatively, server infrastructure 102, management service 104, cluster(s) 106, DNS log 108, DNS request processor 110, network topology generator 112, network policy generator 114, node(s) 116A-116N, pod(s) 118A-118N, DNS server 120, DNS client 122, listener 124, computing device 202, external resource 204, network 206, GUI 208, network policy enforcer 210, and/or the components described therein, and/or the steps of flowcharts 300, 400, 500, 600, and/or 610 are implemented in one or more SoCs (system on chip). An SoC includes an integrated circuit chip that includes one or more of a processor (e.g., a central processing unit (CPU), microcontroller, microprocessor, digital signal processor (DSP), etc.), memory, one or more communication interfaces, and/or further circuits, and optionally executes received program code and/or include embedded firmware to perform functions.

Figure 7:
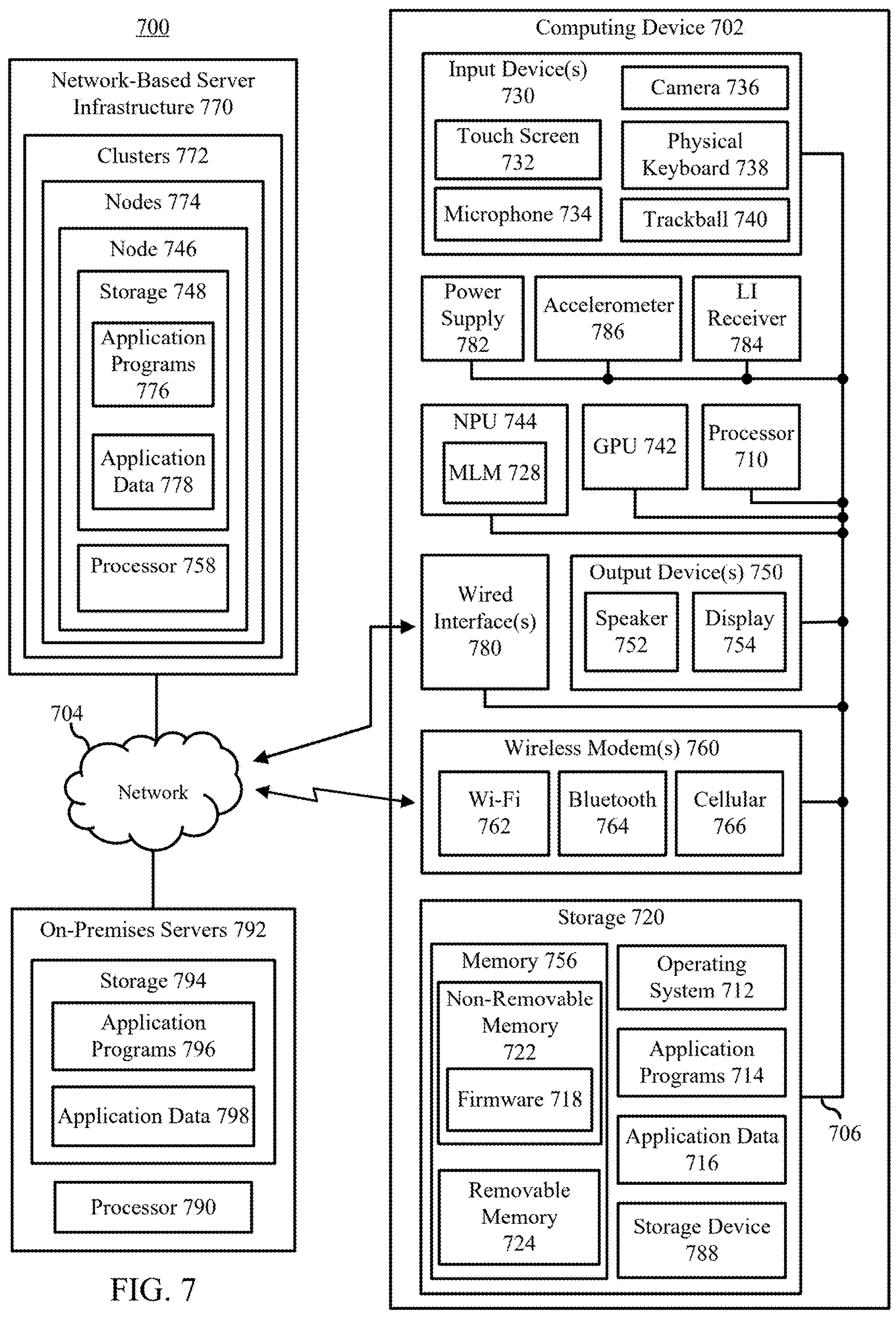
FIG. 7 shows a block diagram of an example computer system in which embodiments may be implemented.

Embodiments disclosed herein can be implemented in one or more computing devices that are mobile (a mobile device) and/or stationary (a stationary device) and include any combination of the features of such mobile and stationary computing devices. Examples of computing devices in which embodiments are implementable are described as follows with respect to FIG. 7. FIG. 7 shows a block diagram of an exemplary computing environment 700 that includes a computing device 702. Computing device 702 is an example of network infrastructure 102, management service 104, cluster(s) 106, node(s) 116A-116N, computing device 202, and/or external resource 204 which each include one or more of the components of computing device 702. In some embodiments, computing device 702 is communicatively coupled with devices (not shown in FIG. 7) external to computing environment 700 via network 704. Network 704 comprises one or more networks such as local area networks (LANs), wide area networks (WANs), enterprise networks, the Internet, etc. In examples, network 704 includes one or more wired and/or wireless portions. In some examples, network 704 additionally or alternatively includes a cellular network for cellular communications. Computing device 702 is described in detail as follows.

Computing device 702 can be any of a variety of types of computing devices. Examples of computing device 702 include a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. In an alternative example, computing device 702 is a stationary computing device such as a desktop computer, a personal computer (PC), a stationary server device, a minicomputer, a mainframe, a supercomputer, etc.

As shown in FIG. 7, computing device 702 includes a variety of hardware and software components, including a processor 710, a storage 720, a graphics processing unit (GPU) 742, a neural processing unit (NPU) 744, one or more input devices 730, one or more output devices 750, one or more wireless modems 760, one or more wired interfaces 780, a power supply 782, a location information (LI) receiver 784, and an accelerometer 786. Storage 720 includes memory 756, which includes non-removable memory 722 and removable memory 724, and a storage device 788. Storage 720 also stores an operating system 712, application programs 714, and application data 716. Wireless modem(s) 760 include a Wi-Fi modem 762, a Bluetooth modem 764, and a cellular modem 766. Output device(s) 750 includes a speaker 752 and a display 754. Input device(s) 730 includes a touch screen 732, a microphone 734, a camera 736, a physical keyboard 738, and a trackball 740. Not all components of computing device 702 shown in FIG. 7 are present in all embodiments, additional components not shown may be present, and in a particular embodiment any combination of the components are present. In examples, components of computing device 702 are mounted to a circuit card (e.g., a motherboard) of computing device 702, integrated in a housing of computing device 702, or otherwise included in computing device 702. The components of computing device 702 are described as follows.

In embodiments, a single processor 710 (e.g., central processing unit (CPU), microcontroller, a microprocessor, signal processor, ASIC (application specific integrated circuit), and/or other physical hardware processor circuit) or multiple processors 710 are present in computing device 702 for performing such tasks as program execution, signal coding, data processing, input/output processing, power control, and/or other functions. In examples, processor 710 is a single-core or multi-core processor, and each processor core is single-threaded or multithreaded (to provide multiple threads of execution concurrently). Processor 710 is configured to execute program code stored in a computer readable medium, such as program code of operating system 712 and application programs 714 stored in storage 720. The program code is structured to cause processor 710 to perform operations, including the processes/methods disclosed herein. Operating system 712 controls the allocation and usage of the components of computing device 702 and provides support for one or more application programs 714 (also referred to as "applications" or "apps"). In examples, application programs 714 include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein. In examples, processor(s) 710 includes one or more general processors (e.g., CPUs) configured with or coupled to one or more hardware accelerators, such as one or more NPUs 744 and/or one or more GPUs 742.

Any component in computing device 702 can communicate with any other component according to function, although not all connections are shown for ease of illustration. For instance, as shown in FIG. 7, bus 706 is a multiple signal line communication medium (e.g., conductive traces in silicon, metal traces along a motherboard, wires, etc.) present to communicatively couple processor 710 to various other components of computing device 702, although in other embodiments, an alternative bus, further buses, and/or one or more individual signal lines is/are present to communicatively couple components. Bus 706 represents one or more of any of several types of bus structures, including a memory bus or memory controller, a peripheral bus, an accelerated graphics port, and a processor or local bus using any of a variety of bus architectures.

Storage 720 is physical storage that includes one or both of memory 756 and storage device 788, which store operating system 712, application programs 714, and application data 716 according to any distribution. Non-removable memory 722 includes one or more of RAM (random access memory), ROM (read only memory), flash memory, a solid-state drive (SSD), a hard disk drive (e.g., a disk drive for reading from and writing to a hard disk), and/or other physical memory device type. In examples, non-removable memory 722 includes main memory and is separate from or fabricated in a same integrated circuit as processor 710. As shown in FIG. 7, non-removable memory 722 stores firmware 718 that is present to provide low-level control of hardware. Examples of firmware 718 include BIOS (Basic Input/Output System, such as on personal computers) and boot firmware (e.g., on smart phones). In examples, removable memory 724 is inserted into a receptacle of or is otherwise coupled to computing device 702 and can be removed by a user from computing device 702. Removable memory 724 can include any suitable removable memory device type, including an SD (Secure Digital) card, a Subscriber Identity Module (SIM) card, which is well known in GSM (Global System for Mobile Communications) communication systems, and/or other removable physical memory device type. In examples, one or more of storage device 788 are present that are internal and/or external to a housing of computing device 702 and are or are not removable. Examples of storage device 788 include a hard disk drive, a SSD, a thumb drive (e.g., a USB (Universal Serial Bus) flash drive), or other physical storage device.

One or more programs are stored in storage 720. Such programs include operating system 712, one or more application programs 714, and other program modules and program data. Examples of such application programs include computer program logic (e.g., computer program code/instructions) for implementing server infrastructure 102, management service 104, cluster(s) 106, DNS log 108, DNS request processor 110, network topology generator 112, network policy generator 114, node(s) 116A-116N, pod(s) 118A-118N, DNS server 120, DNS client 122, listener 124, computing device 202, external resource 204, network 206, GUI 208, network policy enforcer 210, and/or each of the components described therein, as well as any of flowcharts 300, 400, 500, 600, 610, and/or any individual steps thereof.

Storage 720 also stores data used and/or generated by operating system 712 and application programs 714 as application data 716. Examples of application data 716 include web pages, text, images, tables, sound files, video data, and other data. In examples, application data 716 is sent to and/or received from one or more network servers or other devices via one or more wired or wireless networks. Storage 720 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

In examples, a user enters commands and information into computing device 702 through one or more input devices 730 and receives information from computing device 702 through one or more output devices 750. Input device(s) 730 includes one or more of touch screen 732, microphone 734, camera 736, physical keyboard 738 and/or trackball 740 and output device(s) 750 includes one or more of speaker 752 and display 754. Each of input device(s) 730 and output device(s) 750 are integral to computing device 702 (e.g., built into a housing of computing device 702) or are external to computing device 702 (e.g., communicatively coupled wired or wirelessly to computing device 702 via wired interface(s) 780 and/or wireless modem(s) 760). Further input devices 730 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 754 displays information, as well as operating as touch screen 732 by receiving user commands and/or other information (e.g., by touch, finger gestures, virtual keyboard, etc.) as a user interface. Any number of each type of input device(s) 730 and output device(s) 750 are present, including multiple microphones 734, multiple cameras 736, multiple speakers 752, and/or multiple displays 754.

In embodiments where GPU 742 is present, GPU 742 includes hardware (e.g., one or more integrated circuit chips that implement one or more of processing cores, multiprocessors, compute units, etc.) configured to accelerate computer graphics (two-dimensional (2D) and/or three-dimensional (3D)), perform image processing, and/or execute further parallel processing applications (e.g., training of neural networks, etc.). Examples of GPU 742 perform calculations related to 3D computer graphics, include 2D acceleration and framebuffer capabilities, accelerate memory-intensive work of texture mapping and rendering polygons, accelerate geometric calculations such as the rotation and translation of vertices into different coordinate systems, support programmable shaders that manipulate vertices and textures, perform oversampling and interpolation techniques to reduce aliasing, and/or support very high-precision color spaces.

In examples, NPU 744 (also referred to as an "artificial intelligence (AI) accelerator" or "deep learning processor (DLP)") is a processor or processing unit configured to accelerate artificial intelligence and machine learning applications, such as execution of machine learning (ML) model (MLM) 728. In an example, NPU 744 is configured for a data-driven parallel computing and is highly efficient at processing massive multimedia data such as videos and images and processing data for neural networks. NPU 744 is configured for efficient handling of AI-related tasks, such as speech recognition, background blurring in video calls, photo or video editing processes like object detection, etc.

In embodiments disclosed herein that implement ML models, NPU 744 can be utilized to execute such ML models, of which MLM 728 is an example. For instance, where applicable, MLM 728 is a generative AI model that generates content that is complex, coherent, and/or original. For instance, a generative AI model can create sophisticated sentences, lists, ranges, tables of data, images, essays, and/or the like. An example of a generative AI model is a language model. A language model is a model that estimates the probability of a token or sequence of tokens occurring in a longer sequence of tokens. In this context, a "token" is an atomic unit that the model is training on and making predictions on. Examples of a token include, but are not limited to, a word, a character (e.g., an alphanumeric character, a blank space, a symbol, etc.), a sub-word (e.g., a root word, a prefix, or a suffix). In other types of models (e.g., image based models) a token may represent another kind of atomic unit (e.g., a subset of an image). Examples of language models applicable to embodiments herein include large language models (LLMs), text-to-image AI image generation systems, text-to-video AI generation systems, etc. A large language model (LLM) is a language model that has a high number of model parameters. In examples, an LLM has millions, billions, trillions, or even greater numbers of model parameters. Model parameters of an LLM are the weights and biases the model learns during training. Some implementations of LLMs are transformer-based LLMs (e.g., the family of generative pre-trained transformer (GPT) models). A transformer is a neural network architecture that relies on self-attention mechanisms to transform a sequence of input embeddings into a sequence of output embeddings (e.g., without relying on convolutions or recurrent neural networks).

In further examples, NPU 744 is used to train MLM 728. To train MLM 728, training data is that includes input features (attributes) and their corresponding output labels/target values (e.g., for supervised learning) is collected. A training algorithm is a computational procedure that is used so that MLM 728 learns from the training data. Parameters/weights are internal settings of MLM 728 that are adjusted during training by the training algorithm to reduce a difference between predictions by MLM 728 and actual outcomes (e.g., output labels). In some examples, MLM 728 is set with initial values for the parameters/weights. A loss function measures a dissimilarity between predictions by MLM 728 and the target values, and the parameters/weights of MLM 728 are adjusted to minimize the loss function. The parameters/weights are iteratively adjusted by an optimization technique, such as gradient descent. In this manner, MLM 728 is generated through training by NPU 744 to be used to generate inferences based on received input feature sets for particular applications. MLM 728 is generated as a computer program or other type of algorithm configured to generate an output (e.g., a classification, a prediction/inference) based on received input features, and is stored in the form of a file or other data structure.

In examples, such training of MLM 728 by NPU 744 is supervised or unsupervised. According to supervised learning, input objects (e.g., a vector of predictor variables) and a desired output value (e.g., a human-labeled supervisory signal) train MLM 728. The training data is processed, building a function that maps new data on expected output values. Example algorithms usable by NPU 744 to perform supervised training of MLM 728 in particular implementations include support-vector machines, linear regression, logistic regression, Naïve Bayes, linear discriminant analysis, decision trees, K-nearest neighbor algorithm, neural networks, and similarity learning.

In an example of supervised learning where MLM 728 is an LLM, MLM 728 can be trained by exposing the LLM to (e.g., large amounts of) text (e.g., predetermined datasets, books, articles, text-based conversations, webpages, transcriptions, forum entries, and/or any other form of text and/or combinations thereof). In examples, training data is provided from a database, from the Internet, from a system, and/or the like. Furthermore, an LLM can be fine-tuned using Reinforcement Learning with Human Feedback (RLHF), where the LLM is provided the same input twice and provides two different outputs and a user ranks which output is preferred. In this context, the user's ranking is utilized to improve the model. Further still, in example embodiments, an LLM is trained to perform in various styles, e.g., as a completion model (a model that is provided a few words or tokens and generates words or tokens to follow the input), as a conversation model (a model that provides an answer or other type of response to a conversation-style prompt), as a combination of a completion and conversation model, or as another type of LLM model.

According to unsupervised learning, MLM 728 is trained to learn patterns from unlabeled data. For instance, in embodiments where MLM 728 implements unsupervised learning techniques, MLM 728 identifies one or more classifications or clusters to which an input belongs. During a training phase of MLM 728 according to unsupervised learning, MLM 728 tries to mimic the provided training data and uses the error in its mimicked output to correct itself (i.e., correct weights and biases). In further examples, NPU 744 perform unsupervised training of MLM 728 according to one or more alternative techniques, such as Hopfield learning rule, Boltzmann learning rule, Contrastive Divergence, Wake Sleep, Variational Inference, Maximum Likelihood, Maximum A Posteriori, Gibbs Sampling, and backpropagating reconstruction errors or hidden state reparameterizations.

Note that NPU 744 need not necessarily be present in all ML model embodiments. In embodiments where ML models are present, any one or more of processor 710, GPU 742, and/or NPU 744 can be present to train and/or execute MLM 728.

One or more wireless modems 760 can be coupled to antenna(s) (not shown) of computing device 702 and can support two-way communications between processor 710 and devices external to computing device 702 through network 704, as would be understood to persons skilled in the relevant art(s). Wireless modem 760 is shown generically and can include a cellular modem 766 for communicating with one or more cellular networks, such as a GSM network for data and voice communications within a single cellular network, between cellular networks, or between the mobile device and a public switched telephone network (PSTN). In examples, wireless modem 760 also or alternatively includes other radio-based modem types, such as a Bluetooth modem 764 (also referred to as a "Bluetooth device") and/or Wi-Fi modem 762 (also referred to as an "wireless adaptor"). Wi-Fi modem 762 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 764 is configured to communicate with another Bluetooth-capable device according to the Bluetooth short-range wireless technology standard(s) such as IEEE 802.15.1 and/or managed by the Bluetooth Special Interest Group (SIG).

Computing device 702 can further include power supply 782, LI receiver 784, accelerometer 786, and/or one or more wired interfaces 780. Example wired interfaces 780 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 780 of computing device 702 provide for wired connections between computing device 702 and network 704, or between computing device 702 and one or more devices/peripherals when such devices/peripherals are external to computing device 702 (e.g., a pointing device, display 754, speaker 752, camera 736, physical keyboard 738, etc.). Power supply 782 is configured to supply power to each of the components of computing device 702 and receives power from a battery internal to computing device 702, and/or from a power cord plugged into a power port of computing device 702 (e.g., a USB port, an A/C power port). LI receiver 784 is useable for location determination of computing device 702 and in examples includes a satellite navigation receiver such as a Global Positioning System (GPS) receiver and/or includes other type of location determiner configured to determine location of computing device 702 based on received information (e.g., using cell tower triangulation, etc.). Accelerometer 786, when present, is configured to determine an orientation of computing device 702.

Note that the illustrated components of computing device 702 are not required or all-inclusive, and fewer or greater numbers of components can be present as would be recognized by one skilled in the art. In examples, computing device 702 includes one or more of a gyroscope, barometer, proximity sensor, ambient light sensor, digital compass, etc. In an example, processor 710 and memory 756 are co-located in a same semiconductor device package, such as being included together in an integrated circuit chip, FPGA, or system-on-chip (SOC), optionally along with further components of computing device 702.

In embodiments, computing device 702 is configured to implement any of the above-described features of flowcharts herein. Computer program logic for performing any of the operations, steps, and/or functions described herein is stored in storage 720 and executed by processor 710.

In some embodiments, server infrastructure 770 is present in computing environment 700 and is communicatively coupled with computing device 702 via network 704. Server infrastructure 770, when present, is a network-accessible server set (e.g., a cloud-based environment or platform). As shown in FIG. 7, server infrastructure 770 includes clusters 772. Each of clusters 772 comprises a group of one or more compute nodes and/or a group of one or more storage nodes. For example, as shown in FIG. 7, cluster 772 includes nodes 774. Each of nodes 774 are accessible via network 704 (e.g., in a "cloud-based" embodiment) to build, deploy, and manage applications and services. In examples, any of nodes 774 is a storage node that comprises a plurality of physical storage disks, SSDs, and/or other physical storage devices that are accessible via network 704 and are configured to store data associated with the applications and services managed by nodes 774.

Each of nodes 774, as a compute node, comprises one or more server computers, server systems, and/or computing devices. For instance, a node 774 in accordance with an embodiment includes one or more of the components of computing device 702 disclosed herein. Each of nodes 774 is configured to execute one or more software applications (or "applications") and/or services and/or manage hardware resources (e.g., processors, memory, etc.), which are utilized by users (e.g., customers) of the network-accessible server set. In examples, as shown in FIG. 7, nodes 774 includes a node 746 that includes storage 748 and/or one or more of a processor 758 (e.g., similar to processor 710, GPU 742, and/or NPU 744 of computing device 702). Storage 748 stores application programs 776 and application data 778. Processor(s) 758 operate application programs 776 which access and/or generate related application data 778. In an implementation, nodes such as node 746 of nodes 774 operate or comprise one or more virtual machines, with each virtual machine emulating a system architecture (e.g., an operating system), in an isolated manner, upon which applications such as application programs 776 are executed.

In embodiments, one or more of clusters 772 are located/co-located (e.g., housed in one or more nearby buildings with associated components such as backup power supplies, redundant data communications, environmental controls, etc.) to form a datacenter, or are arranged in other manners. Accordingly, in an embodiment, one or more of clusters 772 are included in a datacenter in a distributed collection of datacenters. In embodiments, exemplary computing environment 700 comprises part of a cloud-based platform.

In an embodiment, computing device 702 accesses application programs 776 for execution in any manner, such as by a client application and/or a browser at computing device 702.

In an example, for purposes of network (e.g., cloud) backup and data security, computing device 702 additionally and/or alternatively synchronizes copies of application programs 714 and/or application data 716 to be stored at network-based server infrastructure 770 as application programs 776 and/or application data 778. In examples, operating system 712 and/or application programs 714 include a file hosting service client configured to synchronize applications and/or data stored in storage 720 at network-based server infrastructure 770.

In some embodiments, on-premises servers 792 are present in computing environment 700 and are communicatively coupled with computing device 702 via network 704. On-premises servers 792, when present, are hosted within an organization's infrastructure and, in many cases, physically onsite of a facility of that organization. On-premises servers 792 are controlled, administered, and maintained by IT (Information Technology) personnel of the organization or an IT partner to the organization. Application data 798 can be shared by on-premises servers 792 between computing devices of the organization, including computing device 702 (when part of an organization) through a local network of the organization, and/or through further networks accessible to the organization (including the Internet). Furthermore, in examples, on-premises servers 792 serve applications such as application programs 796 to the computing devices of the organization, including computing device 702. Accordingly, in examples, on-premises servers 792 include storage 794 (which includes one or more physical storage devices such as storage disks and/or SSDs) for storage of application programs 796 and application data 798 and include a processor 790 (e.g., similar to processor 710, GPU 742, and/or NPU 744 of computing device 702) for execution of application programs 796. In some embodiments, multiple processors 790 are present for execution of application programs 796 and/or for other purposes. In further examples, computing device 702 is configured to synchronize copies of application programs 714 and/or application data 716 for backup storage at on-premises servers 792 as application programs 796 and/or application data 798.

Embodiments described herein may be implemented in one or more of computing device 702, network-based server infrastructure 770, and on-premises servers 792. For example, in some embodiments, computing device 702 is used to implement systems, clients, or devices, or components/subcomponents thereof, disclosed elsewhere herein. In other embodiments, a combination of computing device 702, network-based server infrastructure 770, and/or on-premises servers 792 is used to implement the systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 720. Such computer-readable media and/or storage media are distinguished from and non-overlapping with communication media, propagating signals, and signals per se. Stated differently, "computer program medium," "computer-readable medium," "computer-readable storage medium," and "computer-readable storage device" do not encompass communication media, propagating signals, and signals per se. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 714) are stored in storage 720. Such computer programs can also be received via wired interface(s) 760 and/or wireless modem(s) 760 over network 704. Such computer programs, when executed or loaded by an application, enable computing device 702 to implement features of embodiments discussed herein. Accordingly, such computer programs represent controllers of the computing device 702.

Embodiments are also directed to computer program products comprising computer code or instructions stored on any computer-readable medium or computer-readable storage medium. Such computer program products include the physical storage of storage 720 as well as further physical storage types.

IV. Additional Example Embodiments

In embodiments, a system comprises: a processor; and a memory device that stores program code structured to cause the processor to: determine network connection and dependency information of a computing cluster based on a domain name system (DNS) request associated with the computing cluster; generate a network topology of the computing cluster based on the network connection and dependency information; and generate a network policy based on the network topology.

In embodiments, to determine network connection and dependency information of a computing cluster based on a domain name system (DNS) request associated with the computing cluster, the program code is structured to cause the processor to: determine a source service associated with the DNS request; determine, based on a hostname being queried in the DNS request, a target service associated with the DNS request; and infer a dependency relationship between the source service and target service.

In embodiments, the program code is structured to cause the processor to: display a graphical representation of the network topology comprising a first node representing the source service, a second node representing the target service, and an edge representing the dependency relationship that connects the first node to the second node.

In embodiments, the target service is a network resource external to the computing cluster.

In embodiments, the network policy comprises at least one of: a policy that restricts a network access that is inconsistent with the dependency information; or a firewall rule that allows network traffic to a network resource that is external to the computing cluster.

In embodiments, to determine network connection and dependency information of a computing cluster based on a domain name system (DNS) request associated with the computing cluster, the program code is structured to cause the processor to perform at least one of: access the DNS request in an audit log associated with the computing cluster; or monitor network traffic associated with the computing cluster to detect the DNS request.

In embodiments, the computing cluster comprises at least one of: a container cluster; a Kubernetes cluster; or a Docker cluster.

In embodiments, a method comprises: determine network connection and dependency information of a computing cluster based on a domain name system (DNS) request associated with the computing cluster; generating a network topology of the computing cluster based on the network connection and dependency information; and generating a network policy based on the network topology.

In embodiments, determining network connection and dependency information of a computing cluster based on a domain name system (DNS) request associated with the computing cluster comprises: determining a source service associated with the DNS request; determining, based on a hostname queried in the DNS request, a target service associated with the DNS request; and inferring a dependency relationship between the source service and target service.

In embodiments, the method further comprises displaying a graphical representation of the network topology comprising a first node representing the source service, a second node representing the target service, and an edge representing the dependency relationship that connects the first node to the second node.

In embodiments, the target service is a network resource external to the computing cluster.

In embodiments, the network policy comprises at least one of: a policy that restricts a network access that is inconsistent with the dependency information; or a firewall rule that allows network traffic to a network resource that is external to the computing cluster.

In embodiments, determining network connection and dependency information of a computing cluster based on a domain name system (DNS) request associated with the computing cluster comprises at least one of: accessing the DNS request in an audit log associated with the computing cluster; or monitoring network traffic associated with the computing cluster to detect the DNS request.

In embodiments, the computing cluster comprises at least one of: a container cluster; a Kubernetes cluster; or a Docker cluster.

In embodiments, a computer-readable storage medium comprises executable instructions that, when executed by a processor, cause the processor to: determine network connection and dependency information of a computing cluster based on a domain name system (DNS) request associated with the computing cluster; generate a network topology of the computing cluster based on the network connection and dependency information; and generate a network policy based on the network topology.

In embodiments, to determine network connection and dependency information of a computing cluster based on a domain name system (DNS) request associated with the computing cluster, the executable instructions, when executed by the processor, cause the processor to: determine a source service associated with the DNS request; determine, based on a hostname being queried in the DNS request, a target service associated with the DNS request; and infer a dependency relationship between the source service and target service.

In embodiments, the executable instructions, when executed by the processor, cause the processor to: display a graphical representation of the network topology comprising a first node representing the source service, a second node representing the target service, and an edge representing the dependency relationship that connects the first node to the second node.

In embodiments, the target service is a network resource external to the computing cluster.

In embodiments, the network policy comprises at least one of: a policy that restricts a network access that is inconsistent with the dependency information; or a firewall rule that allows network traffic to a network resource that is external to the computing cluster.

In embodiments, to determine network connection and dependency information of a computing cluster based on a domain name system (DNS) request associated with the computing cluster, the executable instructions, when executed by the processor, cause the processor to perform at least one of: access the DNS request in an audit log associated with the computing cluster; or monitor network traffic associated with the computing cluster to detect the DNS request.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system comprising:
a processor; and
a memory device that stores program code structured to cause the processor to:
detect, from network traffic associated with a computing cluster, a domain name system (DNS) request;
determine, based on the DNS request, network connection and dependency information of the computing cluster;
generate, based on the network connection and dependency information, a network topology of the computing cluster; and
generate, based on the network topology, a network policy.

2. The system of claim 1, wherein, to determine, based on the DNS request, network connection and dependency information of the computing cluster, the program code is structured to cause the processor to:
determine a source service associated with the DNS request;
determine, based on a hostname being queried in the DNS request, a target service associated with the DNS request; and
infer a dependency relationship between the source service and target service.

3. The system of claim 2, wherein the program code is further structured to cause the processor to:
display a graphical representation of the network topology comprising a first node representing the source service, a second node representing the target service, and an edge representing the dependency relationship that connects the first node to the second node.

4. The system of claim 2, wherein the target service is a network resource external to the computing cluster.

5. The system of claim 1, wherein the network policy comprises at least one of:
a policy that restricts a network access that is inconsistent with the dependency information; or
a firewall rule that allows network traffic to a network resource that is external to the computing cluster.

6. The system of claim 1, wherein the computing cluster comprises at least one of:
a container cluster;
a Kubernetes cluster; or
a Docker cluster.

7. A method comprising:
accessing a domain name system (DNS) request in an audit log associated with a computing cluster;
determining, based on the DNS request, network connection and dependency information of the computing cluster;
generating, based on the network connection and dependency information, a network topology of the computing cluster; and
generating, based on the network topology, a network policy.

8. The method of claim 7, wherein said determining, based on the DNS request, network connection and dependency information of a computing cluster comprises:
determining a source service associated with the DNS request;
determining, based on a hostname queried in the DNS request, a target service associated with the DNS request; and
inferring a dependency relationship between the source service and target service.

9. The method of claim 8, further comprising:
displaying a graphical representation of the network topology comprising a first node representing the source service, a second node representing the target service, and an edge representing the dependency relationship that connects the first node to the second node.

10. The method of claim 8, wherein the target service is a network resource external to the computing cluster.

11. The method of claim 7, wherein the network policy comprises at least one of:
a policy that restricts a network access that is inconsistent with the dependency information; or
a firewall rule that allows network traffic to a network resource that is external to the computing cluster.

12. The method of claim 7, wherein the computing cluster comprises at least one of:
a container cluster;
a Kubernetes cluster; or
a Docker cluster.

13. A computer-readable storage medium comprising executable instructions that, when executed by a processor, cause the processor to:
determine, based on a domain name system (DNS) request associated with a computing cluster, network connection and dependency information of the computing cluster;
generate, based on the network connection and dependency information, a network topology of the computing cluster; and
generate, based on the network topology, a network policy, the network policy comprising at least one of: a policy that restricts a network access that is inconsistent with the dependency information, or a firewall rule that allows network traffic to a network resource that is external to the computing cluster.

14. The computer-readable storage medium of claim 13, wherein, to determine, based on the DNS request, network connection and dependency information of the computing cluster, the executable instructions, when executed by the processor, cause the processor to:
determine a source service associated with the DNS request;
determine, based on a hostname being queried in the DNS request, a target service associated with the DNS request; and
infer a dependency relationship between the source service and target service.

15. The computer-readable storage medium of claim 13, wherein the executable instructions, when executed by the processor, cause the processor to:
display a graphical representation of the network topology comprising a first node representing the source service, a second node representing the target service, and an edge representing the dependency relationship that connects the first node to the second node.

16. The computer-readable storage medium of claim 13, wherein the target service is a network resource external to the computing cluster.

17. The computer-readable storage medium of claim 13, wherein, to determine, based on the DNS request, network connection and dependency information of the computing cluster the executable instructions, when executed by the processor, cause the processor to perform at least one of:

access the DNS request in an audit log associated with the computing cluster; or detect, from network traffic associated with the computing cluster, the DNS request.

18. The system of claim 1, wherein the network topology comprises at least one of:

a directed graph; or a dependency graph.

19. The method of claim 7, wherein the network topology comprises at least one of:

a directed graph; or a dependency graph.

20. The computer-readable storage medium of claim 13, wherein the computing cluster comprises at least one of:

a container cluster;

a Kubernetes cluster; or a Docker cluster.

* * * * *